United States Patent
Fournier et al.

(10) Patent No.: US 6,438,942 B2
(45) Date of Patent: Aug. 27, 2002

(54) CASCADE-TYPE REVERSERS FOR JET ENGINES

(75) Inventors: Alain Fournier, Le Plessis Robinson; Bernard Laboure, Velizy; Robert R. Standish, Saint-Cloud, all of (FR)

(73) Assignee: Societe de Construction des Avions Hurel-Dubois (Societe Anonyme), Meudon-la-Foret (FR)

( * ) Notice: Subject to any disclaimer, the term of this patent is extended or adjusted under 35 U.S.C. 154(b) by 0 days.

(21) Appl. No.: 09/729,200

(22) Filed: Dec. 5, 2000

(30) Foreign Application Priority Data

Jul. 24, 2000 (FR) .............................. 00 09660

(51) Int. Cl.⁷ ................................................ F02K 3/02
(52) U.S. Cl. ................................... 60/226.2; 244/110 B
(58) Field of Search ....................... 60/226.2; 244/110 B

(56) References Cited

U.S. PATENT DOCUMENTS

| 3,511,055 A | 5/1970 | Timms |
| 4,232,516 A | 11/1980 | Lewis et al. |
| 4,373,328 A * | 2/1983 | Jones ........................ 60/226.2 |
| 4,442,987 A | 4/1984 | Legrand et al. |
| 6,151,883 A * | 11/2000 | Hatrick et al. ............. 60/226.2 |

FOREIGN PATENT DOCUMENTS

| FR | 1 260 040 | 8/1961 |
| FR | 2 132 380 | 11/1972 |
| FR | 2 349 738 | 11/1977 |

* cited by examiner

*Primary Examiner*—Michael Koczo
(74) *Attorney, Agent, or Firm*—Young & Thompson

(57) ABSTRACT

The cascade-type thrust reverser comprises a cowling in which there is formed an opening which, when in a direct thrust mode, is closed by a sliding cowl and which, in a thrust-reversal mode, is uncovered by the translation of the said sliding cowl, a fan duct being defined between an interior skin and an exterior skin, said exterior skin having a radius Re in the plane transversal to the longitudinal axis of the reverser and passing through the upstream end of the sliding cowl in the direct thrust mode, and said interior skin having, downstream of this upstream plane, a maximum radius Ri in a plane parallel to the upstream plane, the upstream end of the said sliding cowl substantially blocking the fan duct upstream of the said downstream plane in a thrust-reversal mode, the said radius Re being less than the radius Ri.

7 Claims, 4 Drawing Sheets

CASCADE-TYPE REVERSERS FOR JET ENGINES

FIELD OF THE INVENTION

The present invention relates in general to thrust reversers for jet engines, more particularly to reversers of the so-called cascade type, and even more particularly still, to "natural" cascade-type reversers.

BACKGROUND OF THE INVENTION

Cascade-type reversers employ:

to create a discharge opening in the cowling of the engine nacelle: an opening formed in the said cowling, which opening is closed, when in a direct-thrust mode, by a sliding cowl and which is uncovered, in a thrust-reversal mode, by the downstream translation (with reference to the direction of flow of the gases) of the said sliding cowl, a fan duct being defined between an interior skin and an exterior skin into which the interior skin of the sliding cowl is incorporated in a direct-thrust mode, the said opening being equipped with cascades which are shaped so as to direct the reversed jet, and to substantially block the cold stream (fan air) flowing through the fan duct and deflect it forward through the cascades of the opening thus uncovered in the cowling means the nature of which depends on the ratio between the radius of the said exterior skin of the fan duct and that of the interior skin thereof.

Thus, when this ratio is constant, it is necessary, in order to deflect the cold stream (i.e. the fan flow), to provide a series of small blocker doors which are articulated, on the one hand, to the said sliding cowl and, on the other hand, via a link rod, to the inner fixed structure opposite and which position themselves across the fan duct when the sliding cowl is translated downstream.

When, by contrast, at some point on the fan duct this ratio between the radii has a minimum value, which occurs when the engine forms a bulge whose shape is assumed by the said interior skin, it is possible to take advantage of this geometry to dispense with the small blocker doors and their link rods and block the fan duct using the sliding cowl itself. To do this, a more upstream part of the interior skin of the fan duct is integrated into it by thus giving the upstream interior end of the sliding cowl a spoiler-type configuration which, at the end of travel into the deployed position of the sliding cowl, positions itself circumferentially tangent to the said bulge and thus substantially blocks the fan duct.

The resultant type of reverser is what is known as a "natural" cascade-type reverser, the sliding cowl "naturally" blocking the fan duct.

For further details on this type of reverser, reference may be made to FR-A-2 132 380, FR-A-2 349 738 and U.S. Pat. No. 4,232,516.

Although the use of the sliding cowl itself for blocking the fan duct has the advantage of reducing the complexity of the structure by omitting the blocker doors and link rods, it does by contrast present a number of limitations.

Integrating this spoiler-type part into the sliding cowl lengthens the latter on the upstream side which means that the sliding cowl has to be translated over a longer distance to uncover the opening formed in the nacelle cowling. It then follows that use has to be made of actuators which have a longer stroke in order to bring about the desired displacement.

Furthermore, in order to be able to remove and refit the sliding cowl for installation and maintenance purposes by sliding it along rails, it is necessary that the radius of the upstream end of the interior skin of the sliding cowl (that is to say the tip of the spoiler part) be greater than the maximum radius of the interior skin of the fan duct (that is to say the bulge). It then follows that, when the sliding cowl is in a thrust-reversal mode, there still remains some leakage of cold stream in direct thrust between the spoiler part of the sliding cowl and the bulge of the interior skin of the fan duct.

From another viewpoint, the closer the spoiler part of the sliding cowl is to the bulge, the further away will be the upstream face of the sliding cowl from the downstream end of the cascade assembly. This upstream face is made up of a partition which follows on from the spoiler part and which extends outwards from the interior wall of the sliding cowl towards its exterior wall, without reaching the latter, the space left unoccupied forming an access to a cavity in the sliding cowl to house the cascade assembly in the direct-thrust mode.

When, in a thrust-reversal mode, the spoiler part of the sliding cowl is near to the bulge, the partition is appreciably downstream of the cascade assembly, leaving a passage in this region, through which hole some of the deflected cold stream escapes, with a loss in efficiency as far as the directing of the said stream is concerned.

Last, and by no means least of the drawbacks, some of the deflected gases which do not escape via the cascades or this passage, are forced into the aforementioned cavity. This results in considerable noise which may be as high as 150 dB, and in risks to the structural integrity of the sliding cowl which has to be reinforced, leading to an increase in weight.

SUMMARY OF THE INVENTION

The object of the present invention is to overcome these drawbacks by proposing a reverser of the aforementioned type in which the radius Re of the exterior skin of the fan duct, taken in the plane P1 known as the "upstream plane", transversal to the longitudinal axis of the reverser and passing through the upstream end of the sliding cowl in a direct-thrust mode, is less than the maximum radius Ri of the interior skin of the fan duct, taken in a plane P2 known as the "downstream plane", parallel to the plane P1 and downstream thereof.

By virtue of this arrangement, the spoiler part of the sliding cowl positions itself near the bulge of the interior skin of the fan duct after a shorter travel of the said cowl, hence there is the possibility of reverting to shorter actuators for maneuvering the sliding cowl.

Furthermore, when the spoiler part of the sliding cowl is near the bulge, the partition belonging to the upstream end of the sliding cowl may be in close proximity to the downstream edge of the cascade assembly, eliminating the possibility of the reversed gases emerging via the opening formed in the cowling without passing through the cascades, but above all preventing some of the gases from being forced into the cavity of the sliding cowl.

BRIEF DESCRIPTION OF THE DRAWINGS

The invention will be better understood and all the features will become apparent from reading the description hereinafter given with reference to the appended drawings in which.

DETAILED DESCRIPTION OF PREFERRED EMBODIMENTS OF THE INVENTION

Figure 1:
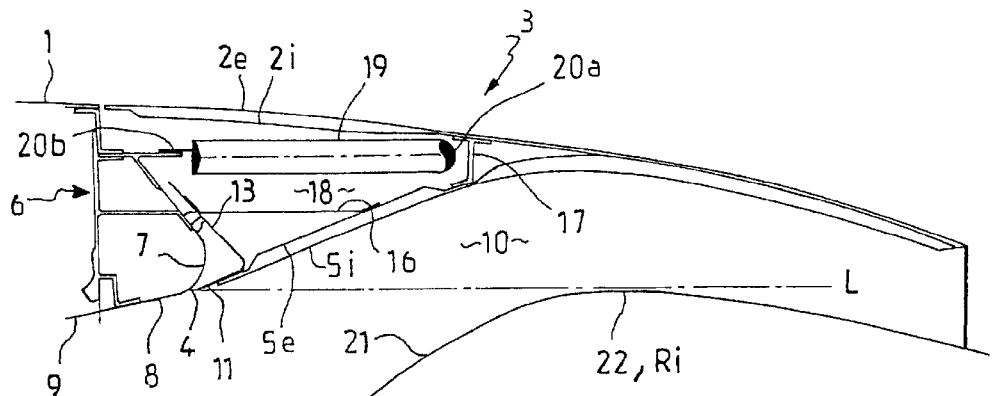
FIG. 1 is a longitudinal part section of an upper part of a nacelle comprising a natural cascade-type thrust reverser in a direct-thrust mode illustrating the state of the art.

In general, thrust-reverser cowlings are made as two half-cowlings which are roughly symmetrical with respect to a longitudinal section plane, the said half-cowlings being articulated along one of their longitudinal edges and able to be locked together along their opposite longitudinal edges. Each reverser half-cowling comprises a sliding half-cowl mounted to slide on the fixed structure of the reverser half-cowling to which it belongs via a pair of rails arranged longitudinally, in the said section plane and, to a very rough approximation, diametrically opposed, the said rails engaging with complementary tracks.

The section plane is at 12 o'clock/6 o'clock if the reverser is fitted to a nacelle under a wing, and at 3 o'clock/9 o'clock if the reverser is fitted to a lateral nacelle. To simplify, the following text will refer only to the 12 o'clock/6 o'clock scenario, it being understood that the explanations are valid mutatis mutandis for the 3 o'clock/9 o'clock scenario.

The 12 o'clock rail in particular, and its track, have a geometry such, in cross section, that the rail can pivot in its track about its longitudinal axis. This possibility which has never been exploited is put to good use by the first embodiment of the invention.

Thus, in the first embodiment of the invention, the radius Re of the upstream interior end of each sliding half-cowl is smaller than the aforementioned radius Ri and the said pair of opposed rails is made up, on the one hand, of a continuous rail arranged at the reverser half-cowling articulation side and extending on each side of the aforementioned downstream plane P2 and, on the other hand, of a rail subdivided into two parts, upstream and downstream, which are mutually parallel, offset in terms of height and length and which both extend on the upstream side with respect to the downstream plane P2.

In this way, the fact that Re<Ri does not constitute an obstacle to sliding. This is because it is possible, by virtue of the system of rails according to the invention, to make each half cowl slide along its continuous rail only, from the downstream end upstream, until the bulge is reached, to cause each half-cowl to pivot about the longitudinal axis of its continuous rail away from the longitudinal axis of the nacelle, to move the half-cowl away from the bulge and pass it by, and, once the bulge has been negotiated, to cause each half-cowl to pivot towards the longitudinal axis of the nacelle until it is capable of engaging with the two rail parts, opposite the continuous rail, and slide along the assembly formed by the continuous rail and the two rail parts.

Naturally, two rail parts which are offset in terms of height and length are provided so that each sliding half-cowl is "grasped" along its entire length as soon as possible after the bulge has been negotiated.

In practice, the downstream end of the upstream rail part and the upstream end of the downstream rail part have a region of overlap.

In another embodiment, the upstream interior end of the sliding cowl comprises a removable base plate which extends upstream from the said end and which is incorporated into the profile of the exterior skin of the fan duct, the radius $Re_1$ of the said base plate being smaller than the said radius Ri and the radius $Re_2$ of the said upstream end of the said sliding cowl being greater than the said radius Ri.

In other words, according to this embodiment, the sliding cowl is equipped with an attached and removable spoiler part (the base plate), by giving the upstream end of the internal skin of the sliding cowl, downstream of the base plate, a radius greater than that of the bulge and by giving the base plate or the upstream end of the base plate a radius smaller than that of the bulge.

In practice, as the sliding cowl is made as two half-cowls, the attached base plate is likewise made as two half-base plates.

Thus, each sliding half-cowl, in its state with the half-base plate removed, can slide on each side of the bulge, for installation or maintenance purposes, without having to resort to a special system of rails according to the first embodiment of the invention, sliding being done on the system of two continuous rails of the prior art. The half-base plate is mounted on the sliding half-cowl once the latter has negotiated the bulge from the downstream upstream, and is removed from the half-cowl before the latter has to negotiate the bulge in the upstream to downstream direction.

EMBODIMENTS OF THE INVENTION

In the references used hereinbelow, "e" means exterior and "i" means interior. To avoid making the description needlessly cumbersome, the fact that the reverser cowling and the sliding cowl each consist of two parts will be neglected in what follows, except with regard to FIG. 7 where this division is a necessity for the solution proposed by the invention.

If reference is made to FIG. 1, there may be seen a part of a nacelle, the exterior skin of which is denoted by 1. In the aerodynamic continuity of this skin 1 is the exterior skin 2e of an exterior double wall 2e, 2i belonging to a sliding cowl 3, also defined by an interior double wall 5e, 5i.

The nacelle comprises a fixed structure 6 which includes a rounded deflection fairing 7, part 8 of which plays a part in forming the exterior skin 9 of the fan duct 10. Also contributing to this, in the direct-thrust mode depicted, is the skin 5i belonging to the sliding cowl 3.

As can be seen, the upstream end of the skin 5e consists of the short side, or base plate 11, of a frame-shaped part 12 (FIG. 2) with an angle smaller than 90°, and the long side 13 or partition of which is roughly parallel to the part 14 (FIG. 2) of the deflection fairing 7 opposite.

A seal 15 mounted on the part 14 (FIG. 2) of the deflection fairing 7 is inserted between the latter and the partition 13 of the part 12 and provides sealing in the direct-thrust mode or stowed position.

The part 12 is permanently secured to the wall 5e, 5i of the sliding cowl 3, particularly by means of a stiffener 16. Another stiffener 17 is mounted between the walls 2i and 5e. The wall 2i and the stiffeners 16 and 17 delimit, within the sliding cowl 3, a cavity 18 intended to house a cascade assembly 19 with a downstream end 20a and an upstream end 20b that is fixed to the fixed structure 6.

As seen earlier, the fan duct 10 is defined by the exterior skin 9 and, as will be described now, by an interior skin 21.

As shown in FIG. 1, this skin has a bulge 22 which results from the particular configuration of the engine.

Figure 2:
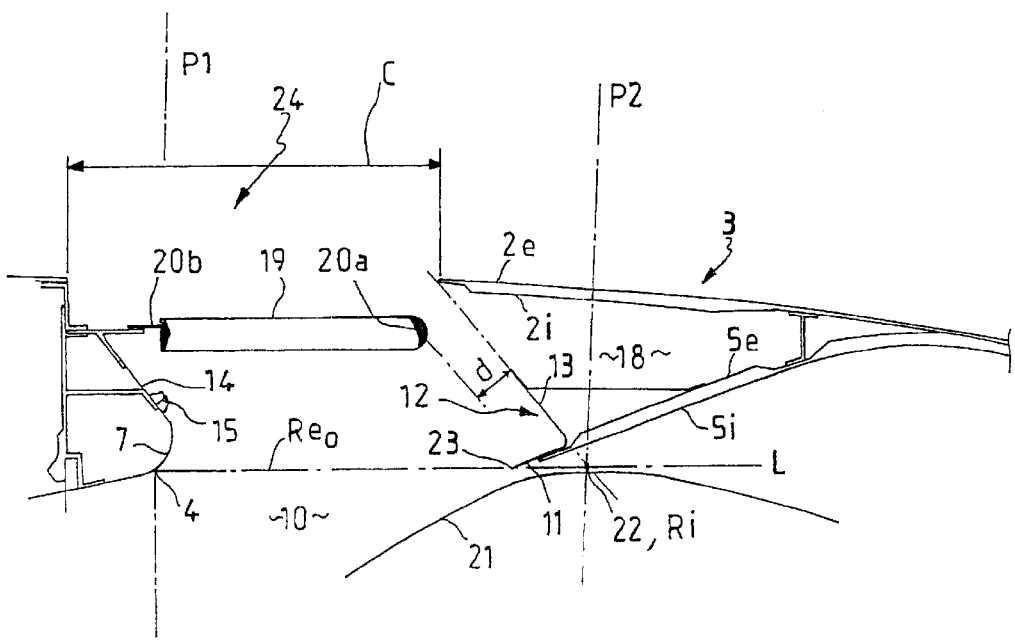
FIG. 2 is a view similar to FIG. 1, but showing the known reverser in a thrust-reversal mode.

Moving on to FIG. 2, which shows the same structure as FIG. 1 but in a thrust-reversal mode, it may be seen that the cowl 3 has slid downstream, by a travel C, uncovering an opening 24 in the nacelle cowling and substantially blocking the fan duct 10. More specifically, the base plate 11 of the part 12 has positioned itself in a position approximately tangential to the bulge 22, while the partition 13 of the part 12 has positioned itself across the fan duct 10.

Figure 3:
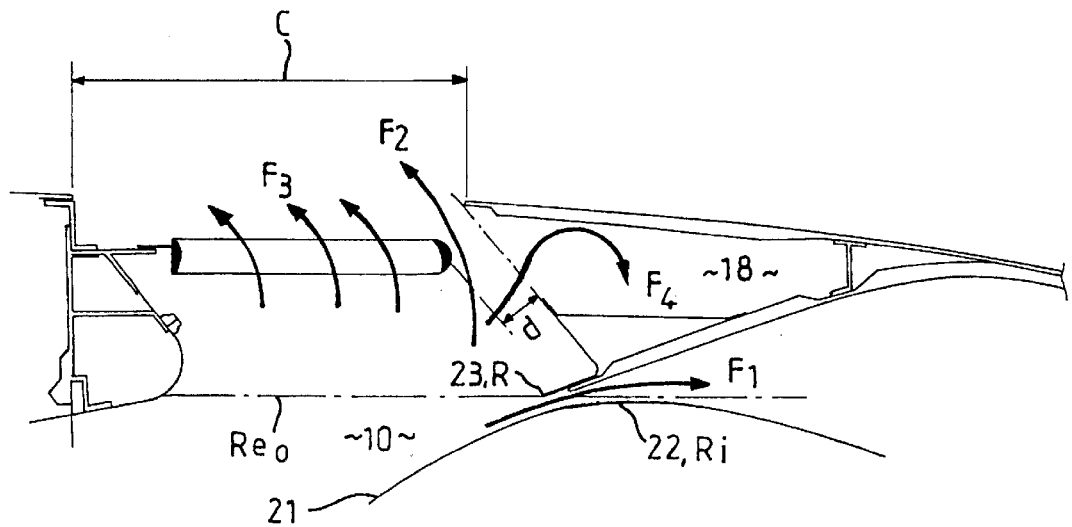
FIG. 3 is a view identical to FIG. 2 but specifically showing the flows in a thrust-reversal mode.

In order to be able to fit and remove the sliding cowl 3, by making it slide entirely downstream, it is necessary for the upstream end 23 of the base plate 11 of the part 12 not to butt against the bulge 22 as it slides and for an operating clearance to be left between them. The line L indicates the maximum extent to which the end 23 and the bulge 22 can be brought together. This line L is secant to the deflection fairing 7 at the point 4, which determines the maximum radius $Re_0$ of the upstream end 23 of the base plate 11 of the part 12 and therefore the radius of the exterior skin 9 of the fan duct in the transverse plane P1 known as the "upstream plane" that this upstream end of the sliding cowl occupies in the direct-thrust position. This radius $Re_0$ is therefore a little greater than the radius Ri of the interior skin 21 at the bulge 22, that is to say in the plane P2 known as the "downstream plane" parallel to P1. It then follows that there is a necessary leakage in direct thrust in the direction of the arrow F1 (FIG. 3).

Furthermore, as emerges from FIG. 2, the partition 13 of the part 12 is considerably downstream (distance d) of the downstream end 20a of the cascade assembly 19. It then follows that some of the deflected cold stream will escape in the direction of the arrow F2 (FIG. 3), that is to say without being directed as it should in the direction of the arrows F3 (FIG. 3). However, above all, some of the deflected cold stream will be forced into the cavity 18 resulting in significant harmful turbulence denoted by the arrow F4 (FIG. 3) and considerable noise.

The solution cannot be to extend the cascade assembly 19 in the downstream direction because its length is limited, on the one hand, by the space available in the sliding cowl 3 and, on the other hand, in absolute terms, for aerodynamic reasons. Thus, even it were possible to extend the cascade assembly downstream, it would have to be shortened on the upstream end, which in turn would entail other structural modifications in the region of the deflection fairing.

According to the invention, the aforementioned drawbacks are overcome by giving the radius Re that the exterior skin 9 has in the plane perpendicular to the axis of the nacelle and passing through the upstream end of the sliding cowl, a value smaller than the radius Ri.

To do this, the part 12 is suitably offset in the upstream direction either by keeping the part 12 fixed permanently to the sliding cowl and providing a special system of rails for the sliding of the cowl, or by making the sliding cowl and the base plate in the form of two separate parts connected by dismantleable means.

Figure 6:
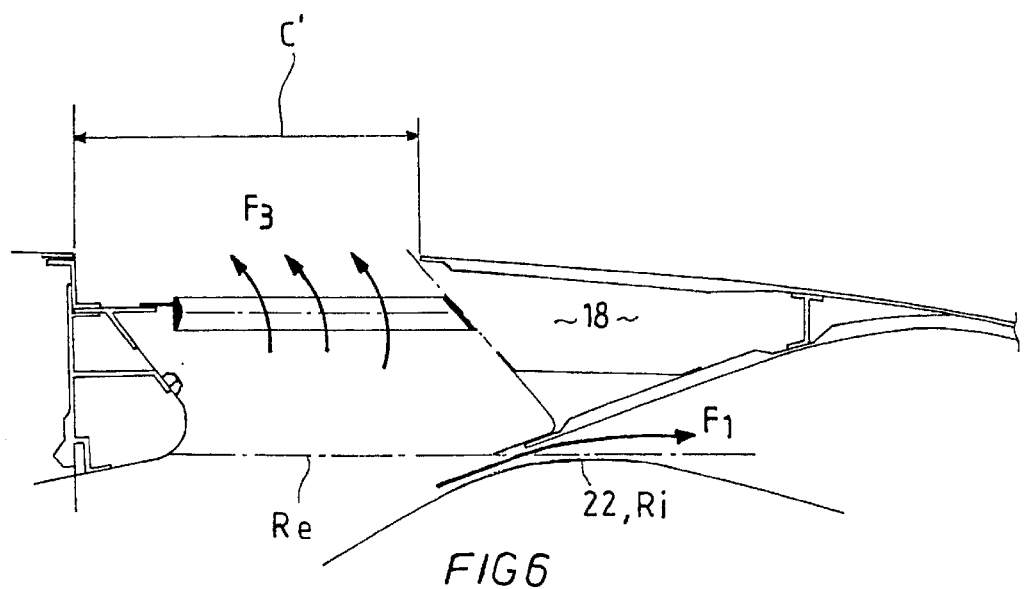
FIG. 6 is a view identical to FIG. 5 but specifically showing the flows in a thrust-reversal mode.
Figure 4:
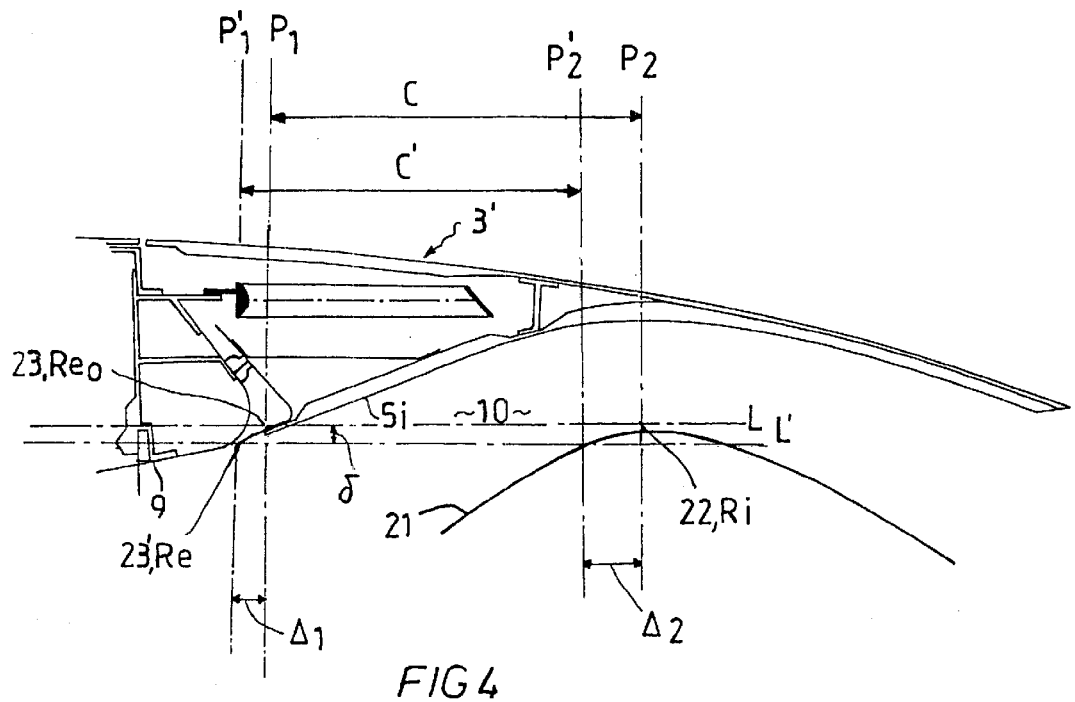
FIG. 4 is a longitudinal part section of an upper part of a nacelle comprising a natural cascade-type thrust reverser in a direct-thrust mode and illustrating the invention.
Figure 5:
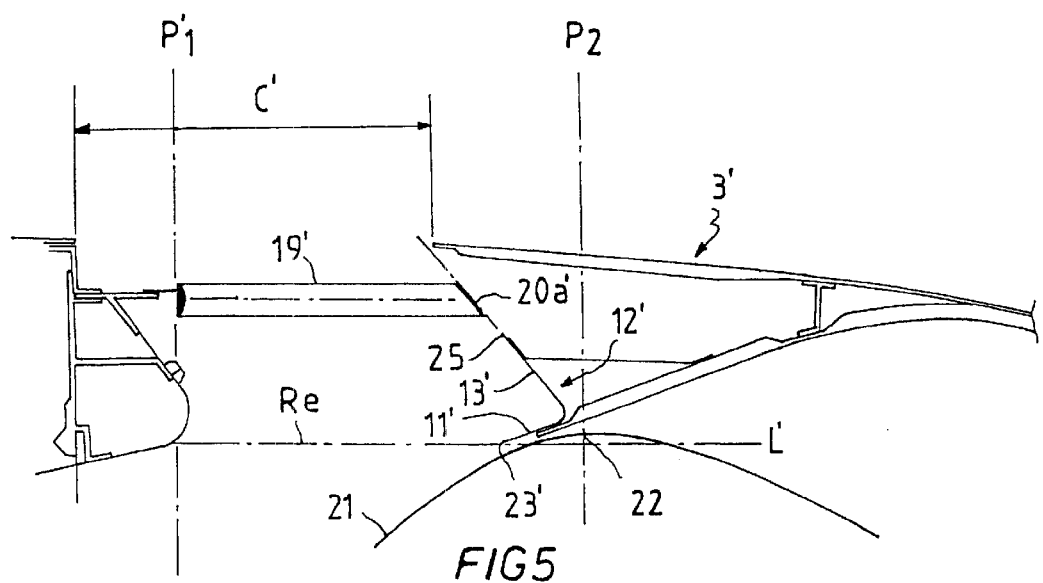
FIG. 5 is a view similar to FIG. 4 but showing the reverser according to the invention in a thrust-reversal mode.

Whatever the solution chosen, the resulting structure has the same overall geometry illustrated in FIGS. 4 to 6.

In these FIGS. 4 to 6, only those elements which are of use in explaining the invention have been identified, unidentified elements being identical to those of FIGS. 1 to 3.

As the objective is to reduce the travel of the sliding cowl, the source of all the aforementioned drawbacks, the difference between the slope that the exterior skin 9 of the fan duct has, in the upstream direction, at the upstream end of the sliding cowl and the slope which the interior skin 21 of the said duct has, in the upstream direction, at the bulge 22 is used to advantage to achieve this.

More specifically, as is apparent from FIG. 4, the line L defined with regard to FIGS. 1 and 2 illustrating the prior art and which corresponds to the radius $Re_0$<Ri is offset heightwise by a distance δ from the line L' secant to the bulge 22 and which defines the radius Re of the upstream end 23' of the sliding cowl according to the invention, such that Re<Ri. Passing through this upstream end 23', in the direct-thrust mode, is a plane P'1 parallel to P1. Corresponding to the distance δ is, on the one hand, a distance Δ1 between the planes P1 and P'1 and, on the other hand a distance Δ2 between the plane P2 and the plane P'2 parallel to P2 and secant to the line L' on the interior skin 21. As can be clearly seen, because of the difference in slope between the skins 9 and 21, Δ2>Δ1 and the difference between these two magnitudes leads to an identical difference between the travels C and C' needed for, respectively, the end 23 (prior art) and the end 23' (invention) of the sliding cowl to reach the position as close as possible to the interior skin 21. The travel needed is thus reduced according to the invention.

In consequence, the base plate 11' of the part 12' reaches a position approximately tangential to the bulge 22 at the end of a shorter travel C' of the sliding cowl 3' (compare also FIGS. 3 and 6) which, on the one hand, makes it possible to reduce the size of the actuators used for maneuvering it and, on the other hand, positions the partition 13' of the piece 12' in close proximity to the downstream end 20a' of the cascade assembly 19', thus forcing almost all of the reversed flow to pass through the said assembly in the direction of the arrows F3 (FIG. 6) and preventing the gases from being forced into the cavity 18. Leaks of cold stream are substantially limited to those in the direction of F1, in direct thrust mode.

To further improve the efficiency of the reversal, the invention envisages, as shown by FIGS. 3 to 6, lengthening the partition 13' of the part 12' in such a way that, in a thrust-reversal mode, its free end 25 is in close proximity to the downstream end 20a' of the cascade assembly 19', and giving this downstream end 20' an orientation aligned with the overall direction of the said partition.

Figure 7:
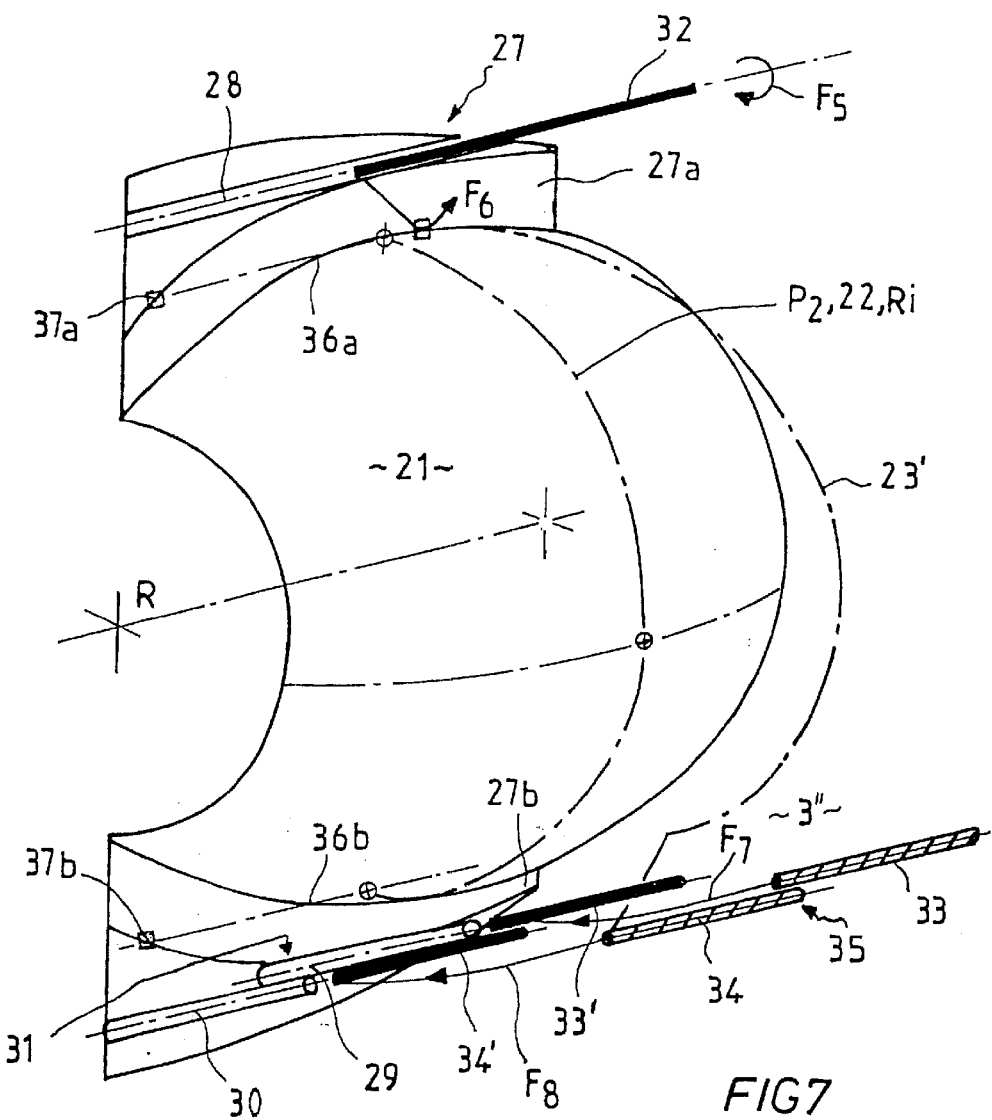
FIG. 7 illustrates, in a perspective view, the principle of the system of rails according to the invention.

When the base plate is permanently fixed to the sliding cowl, recourse is had to the system of rails, the principle of which is illustrated in FIG. 7, to allow the edge 23' to negotiate the bulge 22.

More specifically, FIG. 7 shows the downstream end of the fixed structure 27 of a reverser half-cowling, the 12 o'clock end of which can be seen at 27a, and the 6 o'clock end of which can be seen at 27b, the axis of articulation of the half-cowling being approximately parallel to the axis R of the jet engine and located on the 27a side. The interior skin 21 of the fan duct is also visible, with an indication of the plane P2 in which this skin 21 exhibits the bulge 22 of radius Ri.

Fixed at the 12 o'clock position on the fixed structure of the reverser half-cowling is a track 28 which extends on each side of the plane P2 and which complements a rail 32 hanging down from the sliding half-cowl 3".

The geometry of the cross section of the rail 32 and of its track 28 means that the rail 32 can turn about its longitudinal axis in the track 28, as shown by the arrow F5—as long, of course, as the sliding half-cowl 3" is not held at 6 o'clock.

In the prior art, the sliding half-cowls are simultaneously held at 12 o'clock and at 6 o'clock in so far as they comprise, at 6 o'clock, a rail similar to the rail 32 and a corresponding track, which means that the rails 32 can only slide in their track 28, and not pivot.

However, according to the invention, instead of a track and of a rail which are similar to the track and to the rail at 12 o'clock, there is provided, at 6 o'clock, on the one hand, on the fixed part of the reverser half-cowling, a pair of partial tracks 29 and 30 which are parallel to each other and to the track 28, which partial tracks 29 and 30 are both located upstream of the plane P2 and have a small region of overlap 31 and, on the other hand, on the sliding half-cowl 3", a pair of partial rails 33 and 34 which are parallel to each other and to the rail 32, which partial rails 33 and 34 have a small area of overlap 35.

By virtue of this arrangement it is possible, as shown in FIG. 7, to engage the rail 32 in the railway track 28 without simultaneously engaging the rails 33 and 34 in the tracks 29 and 30. The rail 32 can thus be pivoted in its track 28, which, in the direction of the arrow F6, moves the sliding half-cowl 3" away from the interior skin 21 and allows it to negotiate the bulge 22. When the upstream edge 231 of the sliding half-cowl 3" reaches the plane perpendicular to the axis R of the jet engine and containing the points 36a, 36b, the bulge 22 is negotiated and it is possible to pivot, in the direction of the arrows F7, F8, the half-cowl 3" in the opposite direction to the arrow F6, aligning the rails 33 and the 34, now in positions 33' and 34', with the tracks 29 and 30 and bringing them into mutual engagement. The sliding half-cowl 3" is then held simultaneously at 12 o'clock and at 6 o'clock. The plane passing through the points 37a and 37b and which is perpendicular to the axis R is the plane in which the end 23' of the sliding half-cowl 3" is located, at the end of its travel, in the upstream direction.

It is clearly understood that, in order then to fulfill its function as thrust reverser, the sliding half-cowl 3" has a travel such that, via its rails 32, 33 and 35, it remains constantly in engagement with the tracks at 12 o'clock and 6 o'clock.

Figure 8:
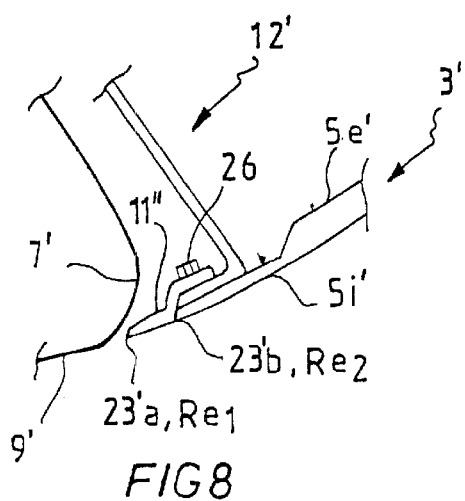
FIG. 8 illustrates one possible method of assembly of an attached base plate.

When the base plate is attached and removable, assembly may be accomplished, for example, as illustrated in FIG. 8; this shows the upstream end of the double wall 5e', 5i' of the sliding cowl 3', to which the part 12' is secured. A base plate 11" is bolted at 26 onto the part 12' and the cowl 3'. The end 23'a of the base plate 11" has a radius $Re_1$ smaller than Ri and the end 23'b of the cowl 3' has a radius $Re_2$ greater than Ri.

It will be readily understood that, without the base plate 11', the sliding cowl 3' can negotiate the bulge 22 without difficulty and that the base plate 11" is not bolted in place until the sliding cowl 3' has only to accomplish its "retracted/deployed" travel to pass from the direct jet mode to the thrust-reversal mode, and vice versa.

The 12 o'clock/6 o'clock configuration described for nacelles under wing structures can obviously be read across to the 9 o'clock/3 o'clock scenario of lateral nacelles.

What we claim is:

1. A thrust reverser for a jet engine, comprising:
   a cowling (27) having a fan duct (10) that is defined between an interior skin (21) and an exterior skin (9);
   a sliding cowl (3') that moves downstream in translation, relative to a direction of flow of gases through the jet engine, to uncover an opening in said cowling in a thrust-reversal mode and that has an interior surface (5i) that is a part of said exterior skin of said fan duct in a direct thrust mode;
   said sliding cowl having an upstream end (23') that has a minimum radius (Re) relative to a longitudinal axis of the jet engine at a first plane (P'1) transverse to the longitudinal axis of the jet engine;
   said interior skin of said fan duct having a maximum radius (Ri) relative to the longitudinal axis of the jet engine at a second plane (P2) that is downstream of said first plane and parallel thereto;
   said upstream end of said sliding cowl substantially blocking said fan duct upstream of said second plane when said sliding cowl has been moved downstream in the thrust-reversal mode;
   said minimum radius being less than said maximum radius;
   said cowling comprising two roughly symmetrical cowling parts relative to a longitudinal section plane, each of said cowling parts having a first track (28) approximately in said longitudinal section plane and that extends upstream and downstream of said second plane, each of said cowling parts also having a pair of second tracks (29, 30) opposite said first track and that extend upstream of said second plane; and
   said sliding cowl comprising two roughly symmetrical halves relative to the longitudinal section plane that are each movably mounted on a respective one of said cowling parts, each said sliding cowl half having a first rail (32) that is rotatable in and movable longitudinally along said first track, each said sliding cowl half also having a pair of second rails (33, 34) that are movable longitudinally along respective ones of said second tracks, wherein each said sliding cowl half is movable downstream on said first track to a location where said second rails are free of said second tracks and is then rotatable about said first track.

2. The thrust reverser of claim 1, wherein said pair of second rails are parallel to each other and axially offset.

3. The thrust reverser of claim 2, wherein said pair of second rails overlap.

4. The thrust reverser of claim 1, further comprising,
   a cascade assembly (19') in said opening for reversing a flow of gases, said cascade assembly having a downstream end (20a') with a first orientation, and
   a partition (13') affixed to and extending outwardly from said upstream end of said sliding cowl, a free end (25) of said partition being in close proximity to said downstream end of said cascade assembly when in the thrust-reversal mode, said partition having the first orientation, said partition substantially blocking said fan duct upstream of said second plane when said sliding cowl has been moved downstream in the thrust-reversal mode.

5. A thrust reverser for a jet engine, comprising:
   a fan duct (10) that is defined between an interior skin (21) and an exterior skin (9);
   a sliding cowl (3') that moves downstream in translation, relative to a direction of flow of gases through the jet engine, to uncover an opening in a thrust-reversal mode and that has an interior surface (5i) that is a part of said exterior skin of said fan duct in a direct thrust mode;
   said sliding cowl having an upstream end (23'b) to which is removably attached a base plate (11') that extends upstream and that is incorporated into said exterior skin, said base plate having an upstream extension (23'a) that has a first minimum radius (Re1) relative to a longitudinal axis of the jet engine at a first plane (P'1) transverse to the longitudinal axis of the jet engine, said upstream end having a second minimum radius (Re2) relative to a longitudinal axis of the jet engine;

said interior skin of said fan duct having a maximum radius (Ri) relative to the longitudinal axis of the jet engine at a second plane (P2) that is downstream of said first plane and parallel thereto;

said upstream end of said sliding cowl substantially blocking said fan duct upstream of said second plane when said sliding cowl has been moved downstream in the thrust-reversal mode; and said first minimum radius being less than said maximum radius and said second minimum radius being greater than said maximum radius.

6. The thrust reverser of claim 5, further comprising, a cascade assembly (19') in said opening for reversing a flow of gases, said cascade assembly having a downstream end (20a') with a first orientation, and a partition (13') affixed to and extending outwardly from said upstream end of said sliding cowl, a free end (25) of said partition being in close proximity to said downstream end of said cascade assembly when in the thrust-reversal mode, said partition having the first orientation, said partition substantially blocking said fan duct upstream of said second plane when said sliding cowl has been moved downstream in the thrust-reversal mode.

7. A thrust reverser for a jet engine, comprising:

a cowling (27) having a fan duct (10) that is defined between an interior skin (21) and an exterior skin (9);

a sliding cowl (3') that moves downstream in translation, relative to a direction of flow of gases through the jet engine, in a thrust-reversal mode and that has an interior surface (5i) that is a part of said exterior skin of said fan duct in a direct thrust mode, said sliding cowl uncovering an opening in said cowling when in the thrust-reversal mode;

a cascade assembly (19') in said opening for reversing a flow of gases, said cascade assembly having a downstream end (20a') with a first orientation;

said sliding cowl having an upstream end (23') that has a minimum radius (Re) relative to a longitudinal axis of the jet engine at a first plane (P'1) transverse to the longitudinal axis of the jet engine;

a partition (13') affixed to and extending outwardly from said upstream end of said sliding cowl, a free end (25) of said partition being in close proximity to said downstream end of said cascade assembly when in the thrust-reversal mode, said partition having the first orientation;

said interior skin of said fan duct having a maximum radius (Ri) relative to the longitudinal axis of the jet engine at a second plane (P2) that is downstream of said first plane and parallel thereto;

said partition of said sliding cowl substantially blocking said fan duct upstream of said second plane when said sliding cowl has been moved downstream in the thrust-reversal mode; and said minimum radius being less than said maximum radius.

* * * * *

UNITED STATES PATENT AND TRADEMARK OFFICE
CERTIFICATE OF CORRECTION

PATENT NO.    : 6,438,942 B2                                               Page 1 of 1
DATED         : August 27, 2002
INVENTOR(S)   : Alain Fournier, Bernard Laboure and Robert R. Standish It is certified that error appears in the above-identified patent and that said Letters Patent is hereby corrected as shown below:

<u>Title page,</u>
Item [73], please change the name of the assignee to -- Hurel-Hispano Meudon, Meudon-La-Foret, (FR) --

Signed and Sealed this

Twenty-ninth Day of October, 2002

Attest:

Attesting Officer

JAMES E. ROGAN
*Director of the United States Patent and Trademark Office*